4 Sheets--Sheet 3.
B. S. BENSON.
Pipe Molding Machines.
No. 154,005. Patented Aug. 11, 1874.
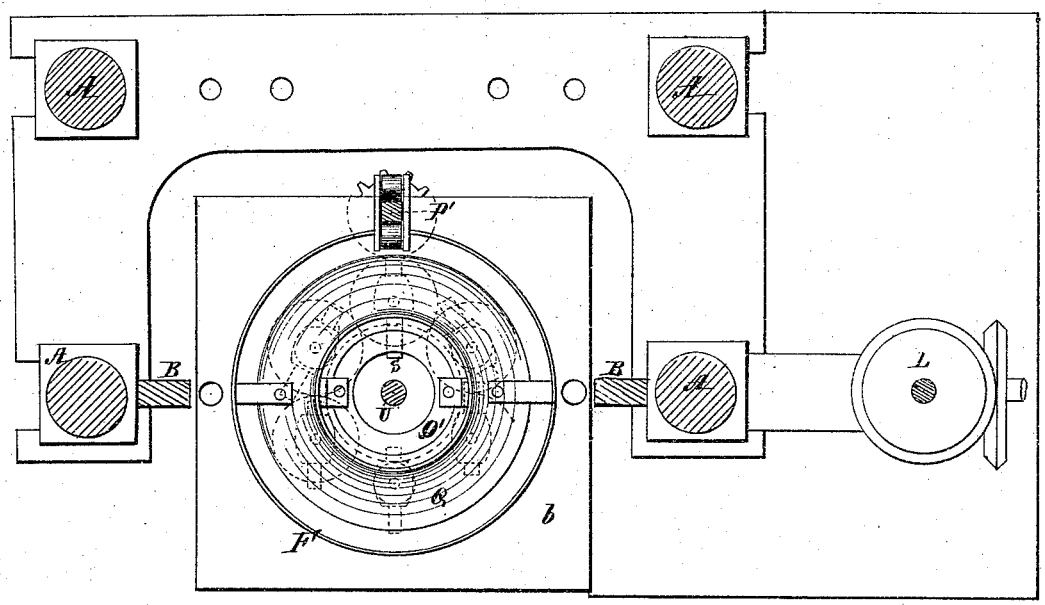
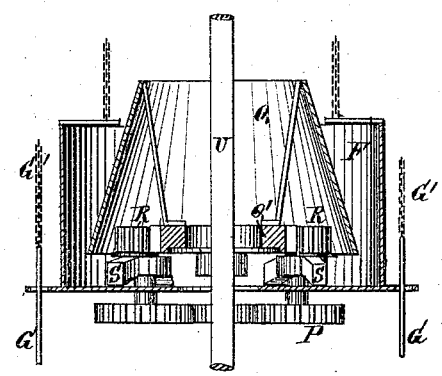
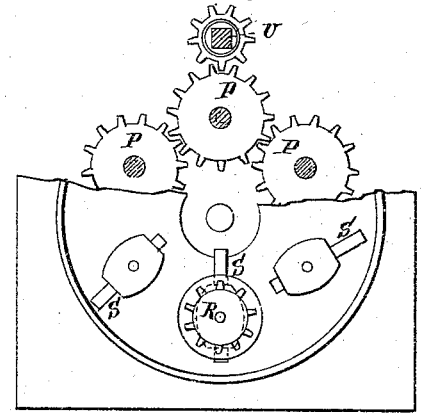
WITNESSES:
INVENTOR:
ATTORNEYS.

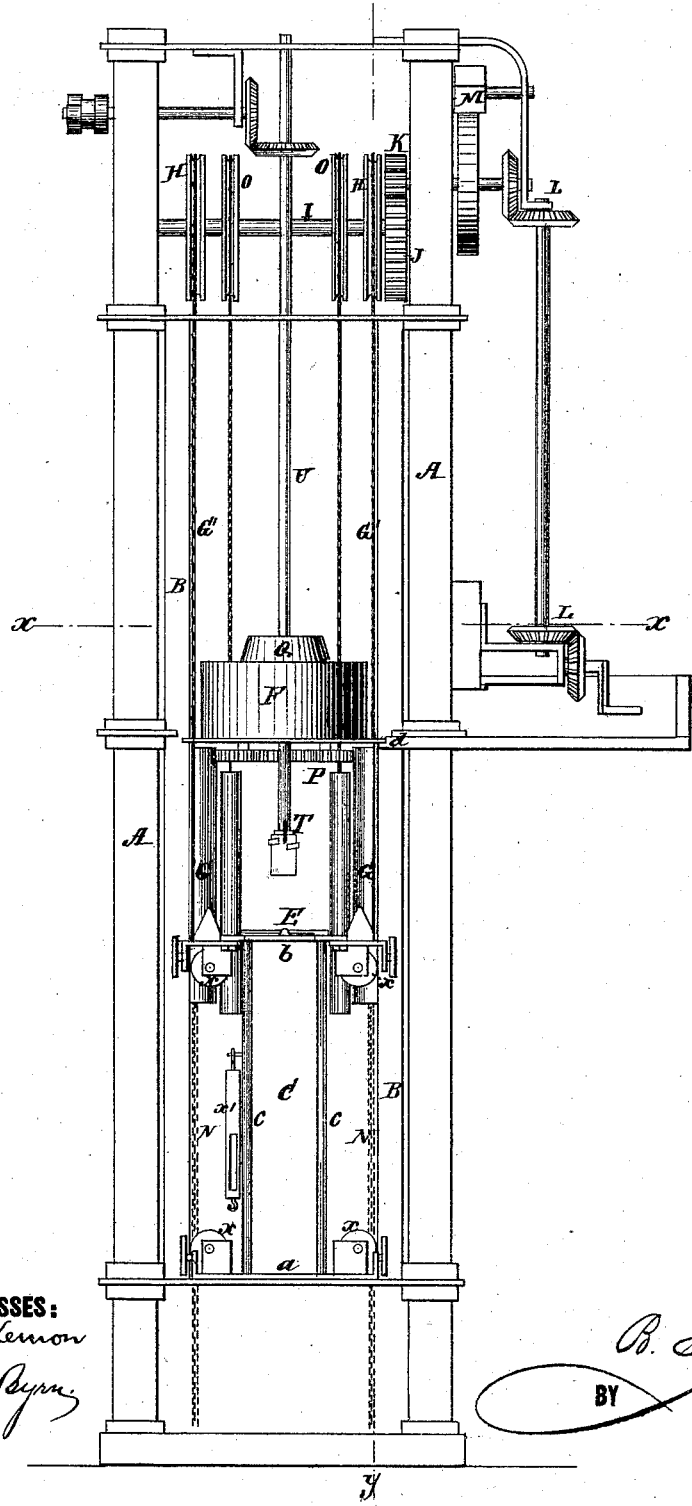

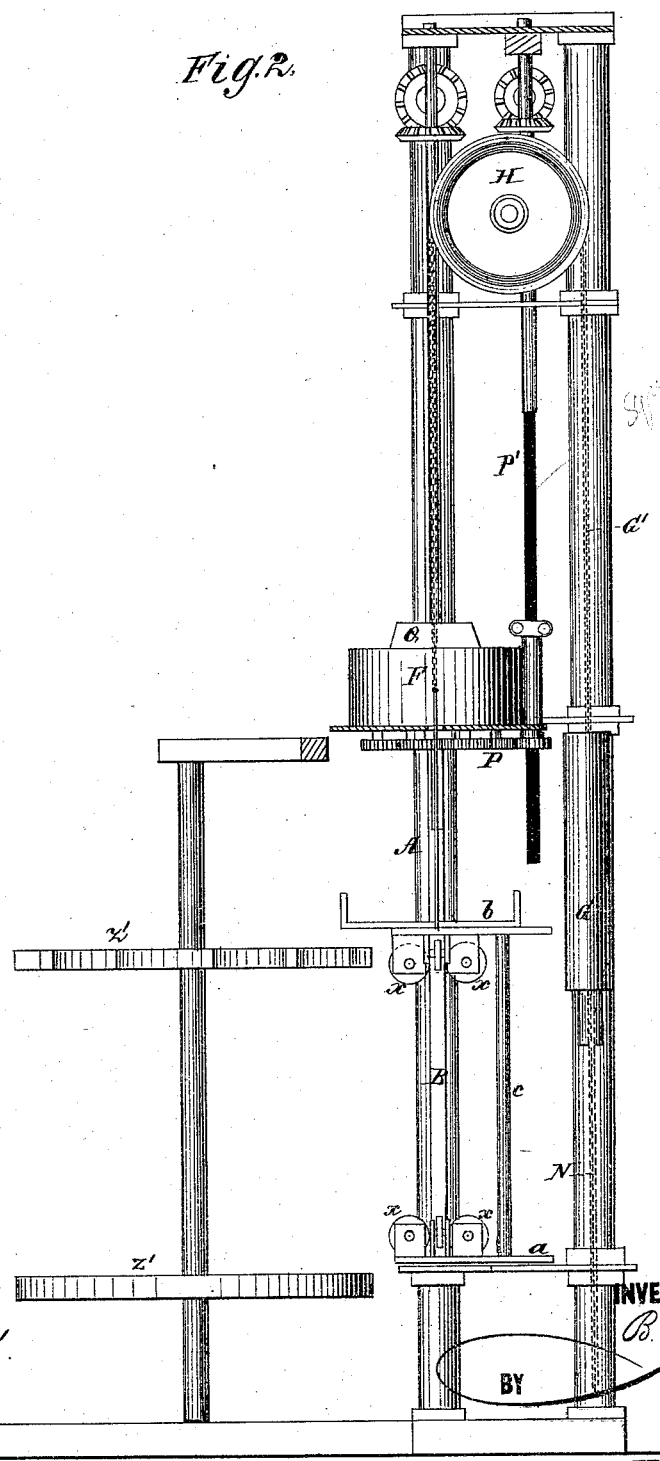

B. S. BENSON.
Pipe Molding Machines.

No. 154,005

4 Sheets--Sheet 4.

Patented Aug. 11, 1874.

WITNESSES:
Solon C Kemon
A. W. F. Cart

INVENTOR:
B. S. Benson
BY
ATTORNEYS.

UNITED STATES PATENT OFFICE.

BENJAMIN S. BENSON, OF BALTIMORE, MARYLAND.

IMPROVEMENT IN PIPE-MOLDING MACHINES.

Specification forming part of Letters Patent No. 154,005, dated August 11, 1874; application filed April 4, 1874.

CASE A.

*To all whom it may concern:*

Be it known that I, BENJAMIN S. BENSON, of Baltimore city, State of Maryland, have invented a new and Improved Machine for Molding Pipe-Molds; and I do hereby declare that the following is a full, clear, and exact description of the same, reference being had to the accompanying drawing, forming a part of this specification, in which—

Figure 6:
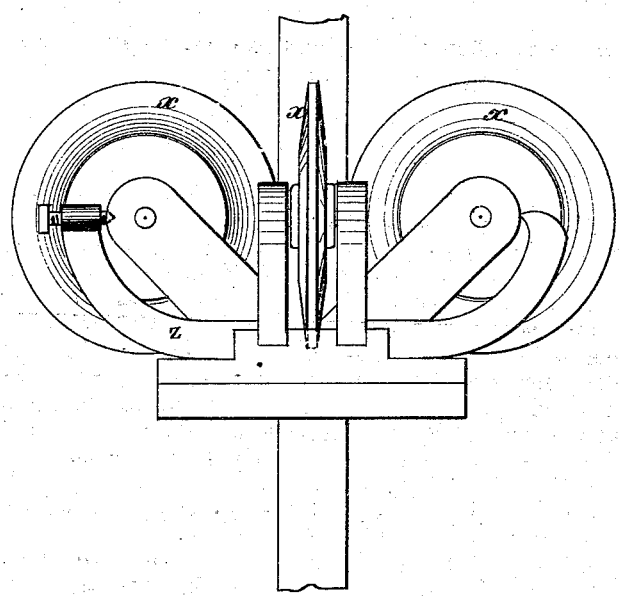
Figure 7:
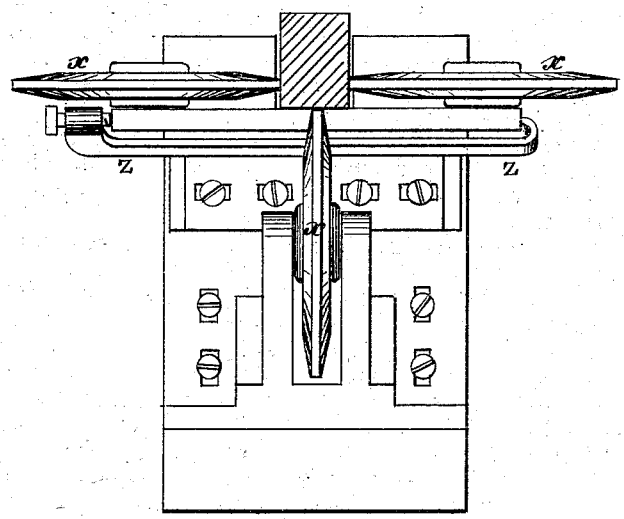

Figures 1 and 2 are, respectively, front and side elevations of the machine. Fig. 3 is a cross-section on line $x\ x$ of Fig. 1. Fig. 4 is a detail sectional elevation of the sand-hopper and connected parts. Fig. 5 is a top view of the bottom of the hopper, part being broken away to show the arrangement of gears. Figs. 6 and 7 are enlarged detail views, showing the arrangement of the guide friction-rollers.

My present invention is an improvement on the machine for preparing the molds for casting metallic pipes, for which I obtained Letters Patent No. 33,178, dated September 3, 1861.

The features of novelty are hereinafter described, generally, in connection with others necessary to constitute an operative machine, and are specifically indicated in the claims.

Referring to the drawing, the vertical frame A has ways or guides B, on which the flask-holder C moves up and down. The flask-holder is constructed substantially as in my patent referred to—that is to say, of a bottom piece, $a$, and corresponding top piece $b$, rigidly connected by rods or bars $c$; but in this instance both top and bottom pieces are provided with friction-rollers $x$, Figs. 6 and 7, which work in contact with guides B, from and toward which they are adjustable to take up wear, and make the movement of flask-holder more sensitive. The rollers which work in contact with the outer and opposite sides of the guides are mounted on arms which are secured to the top and bottom pieces $b\ a$, and adjusted by means of set-screws, which pass through slots, as shown, Figs. 6 and 7. The two outer and opposite rollers are supported by a yoke or curved bar, Z, through one end of which passes a set-screw, to accurately adjust the rollers to the guides B. A device, E, is arranged on the top piece for locking or holding the flask in place. The top piece $b$ has upwardly-projecting stops to support the sand-hopper F when the former is run up on the guides B. The flask-holder is counterbalanced, as in the previous machine, by weights G, suspended by chains G′ passing over pulleys H, which are mounted on a horizontal shaft, I.

It is intended and necessary that the weights should exactly counterbalance the flask-holder only when the latter is at the limit of its upward movement, or in position to commence its downward movement. It is evident, however, that as it descends the equipoise will be destroyed by the chains being drawn up on one side of the pulley H and down on the other. To offset this I employ a supplementary and adjustable counter-balance in the form of chains N, Figs. 1 and 2, which are preferably connected to the bottom of the weights. Thus, as the flask-holder descends and the weights ascend, the chains G′ will be taken up correspondingly, or exactly in proportion to the length of said chains G′, which is transferred to the opposite or front side of the pulleys.

Positive motion may be imparted to the shaft I by means of spur-gear J, its meshing-pinion K, and connected bevel-gearing L. A brake attachment is also provided at M, Fig. 1, by which to hold the flask-holder fixed at any point, or arrest its movement when desired or necessary.

The hopper is counterbalanced by weights suspended by chains, which pass over loose pulleys O on shaft I, and its downward movement (following the flask-holder) is arrested by stops at $d$. A series of meshing gears, P, Figs. 1, 2, 4, 5, are arranged on the under side of the hopper, and motion is communicated to them by a square or polygonal shaft, P′, on which the hopper may be moved up and down. A hollow cone, Q, is also arranged within the hopper.

Thus far, the construction of the hopper and its attachments proper is similar to that shown and described in the patent of 1861. The cone Q is, however, made to revolve on its axis by a centrally-apertured spur-gear, Q', which meshes with two or more pinions, R, arranged within the hopper. These pinions are attached to the shafts of the corresponding gears P on the under side of the hopper. The rotary movement of the cone Q causes the sand to distribute itself more equally therein, and to feed downward faster than it otherwise would. Radial arms or fingers S project from each of the shafts of the gears P. These are so arranged as to push or throw a quantity of sand into the flask through the central opening in the bottom of the hopper, acting in regular succession or alternation. The pattern or packer T, which is operated by the rotary shaft U, may be constructed as described in my patent of 1861.

The quantity and weight of the sand supplied to the hopper previous to the formation of each mold will vary somewhat, as well as the weight of the flask, and of the mold to be formed.

The spring X may be employed to weigh the molds, or determine beforehand the exact pressure necessary or desired to be brought to bear upon the sand for packing it in the mold.

The reel Z' is located in such proximity to the molding-machine proper that a flask is readily transferred to or from the former.

To operate the machine, the hopper is supplied with a suitable quantity of sand, a flask is clamped in the holder C, and the latter then run up by means of gearing L till the packer T reaches the chill-mold, on which the flask rests. Rotary motion is then communicated to the shafts U and P', whereby the packer revolves, and also the fingers and cone in the hopper. The sand is thus fed into the flask and compressed into suitable form by the pattern T, which also forces the flask-holder downward. When the mold is formed, the flask is removed into the reel, and the head is dressed and blackwashed. It is then transferred to the drying-pit.

What I claim is—

1. The revolving cone, annular gear Q', and one or more gears, R, in combination with the hopper, as shown and described.

2. The combination, with the flask-holder and vertical guides, of the friction-rollers mounted on adjustable journals, substantially as set forth.

BENJAMIN S. BENSON.

Witnesses:
L. TISCHMEYER,
C. I. SEIP.